(12) United States Patent
Tonry et al.

(10) Patent No.: US 9,792,437 B2
(45) Date of Patent: Oct. 17, 2017

(54) SYSTEM AND METHOD FOR SECURING EMBEDDED CONTROLLER COMMUNICATIONS BY PROVIDING A SECURITY HANDSHAKE

(71) Applicant: Dell Products, LP, Round Rock, TX (US)

(72) Inventors: Richard M. Tonry, Austin, TX (US); Matthew G. Page, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 766 days.

(21) Appl. No.: 14/258,868

(22) Filed: Apr. 22, 2014

(65) Prior Publication Data

US 2015/0302200 A1    Oct. 22, 2015

(51) Int. Cl.
*G06F 21/57* (2013.01)
*G06F 9/48* (2006.01)
*G06F 21/55* (2013.01)
*G06F 21/56* (2013.01)
*G06F 21/74* (2013.01)

(52) U.S. Cl.
CPC ............ *G06F 21/57* (2013.01); *G06F 9/4812* (2013.01); *G06F 21/554* (2013.01); *G06F 21/566* (2013.01); *G06F 21/74* (2013.01); *G06F 2221/034* (2013.01)

(58) Field of Classification Search
CPC .... G06F 12/1441; G06F 9/4812; G06F 21/57; G06F 21/74; G06F 21/566; G06F 21/554; G06F 2221/034

See application file for complete search history.

(56) References Cited

U.S. PATENT DOCUMENTS

| | | |
|---|---|---|
| 5,974,573 A | 10/1999 | Martin |
| 7,349,961 B2 | 3/2008 | Yamamoto |
| 2004/0049645 A1* | 3/2004 | Lee ................... G06F 12/1441 711/163 |
| 2007/0005820 A1 | 1/2007 | Banzhaf et al. |
| 2010/0037030 A1 | 2/2010 | Kassai et al. |
| 2012/0311664 A1 | 12/2012 | Elrod et al. |

\* cited by examiner

*Primary Examiner* — Ernest Unelus
(74) *Attorney, Agent, or Firm* — Larson Newman, LLP

(57) ABSTRACT

An information handling system includes a processor operable to receive a system management interrupt, and an embedded controller coupled to the processor via a primary interface and via a system management interrupt interface. The embedded controller receives a command to enable address decoding from the processor via the primary interface, sends the system management interrupt via the system management interrupt interface in response to receiving the command, and receives an indication from the processor via the primary interface, the indication including a determination if the processor was operating in a system management mode when the processor sent the command.

20 Claims, 5 Drawing Sheets

SYSTEM AND METHOD FOR SECURING EMBEDDED CONTROLLER COMMUNICATIONS BY PROVIDING A SECURITY HANDSHAKE

FIELD OF THE DISCLOSURE

This disclosure relates generally to information handling systems, and more particularly relates to securing communications with an embedded controller in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include an embedded controller that provides an interface for the management of resources in the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
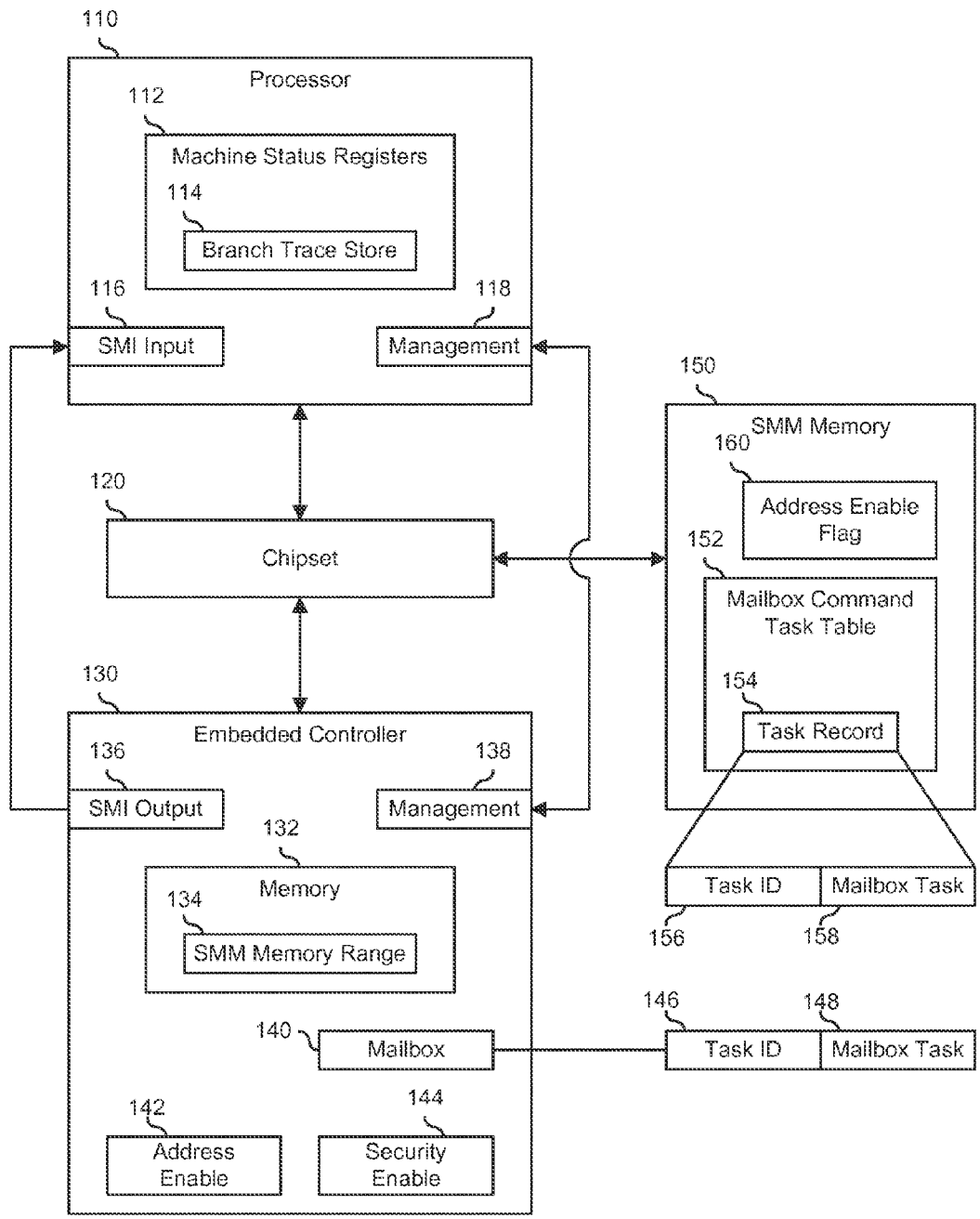
FIG. 1 is a block diagram of an information handling system according to an embodiment of the present disclosure.

FIG. 1 illustrates an information handling system 100. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display.

Information handling system 100 includes a processor 110, a chipset 120, an embedded controller 130, and a System Management Mode (SMM) memory 150. Processor 110 includes one or more Machine Status Registers (MSRs) 112, including a branch trace store 114, a System Management Interrupt (SMI) input 116, and a management interface 118. MSRs 112 operate to provide information related to the processing status of processor 110, and can include status flags, error states, control settings, and the like. Branch trace store 114 operates to store branch trace messages that describe the results of branch instructions executed by processor 110. For example, a branch trace message can include an indication of the memory address of the branch instruction, a memory address of the starting location of the branch taken, and an indication if a branch predictor of processor 110 correctly predicted the outcome of the branch instruction.

Processor 110 operates in one of several different operating modes, including the System Management Mode (SMM). In SMM, processor 110 suspends normal code execution, stores the one or more MSRs 112 to preserve the machine state for the normal code execution, and proceeds to execute special System Management code from SMM memory 150. SMM can be utilized for error handing, processor thermal monitoring, managing motherboard and component power and thermal controls, or other functions, as needed or desired. SMI input 116 operates to receive requests from one or more components of information handling system 100 for processor 110 to enter SMM. When processor 110 receives an SMI request on SMI input 116, an interrupt handler in SMM memory 150 determines which component generated the SMI, and takes appropriate actions in response to the SMI request.

Management interface 118 provides side-band communication between processor 110 and one or more components of information handling system 100, including embedded controller 130. Via management interface 118, a component can provide manufacturer information for the component, indicate the component model or part number, save component state for a suspend event, report different types of errors, accept control parameters, return status, or other functions, as needed or desired. In a particular embodiment, processor 110 operates to provide the branch trace messages from branch trace store 114 to the components of information handling system 100 via management interface 118. An example of management interface 118 includes a Processor Environment Control Interface (PECI), a Host Embedded Controller Interface (HECI), another side-band communication interface, or a combination thereof.

Chipset 130 operates to manage data flows between processor 110 and the components of information handling system 100. As such chipset 120 is connected to processor 110 via a high bandwidth data and control interface. Chipset 120 typically includes one or more additional data and control interfaces, such as Peripheral Component Interconnect Express (PCIe) interfaces, Serial ATA (SATA) interfaces, Universal Serial Bus (USB) interfaces, or other interfaces, as needed or desired. Chipset 120 is connected to embedded controller 130 via a lower bandwidth data and control interface, such as a Low Pin Count (LPC) bus, a Serial Peripheral Interface (SPI) or another lower bandwidth interface, as needed or desired. In a particular embodiment, chipset 120 is operable to provide an SMI signal to SMI input 116 to handle system management events for the components of information handling system 100.

Embedded controller 130 operates to provide status information and control of auxiliary functions of the components of information handling system 100, such as thermal status monitoring of a power supply, of processor 110, of chipset 120, or other components, cooling fan control, status indicator control, or other auxiliary functions of the information handling system, as needed or desired. In a particular embodiment, embedded controller 130 operates to permit the programming of a system BIOS Read Only Memory (ROM) and other firmware devices of information handling system 100. Embedded controller 130 includes a memory 132, an SMI output 136 connected to SMI input 116, and a management interface 138 connected to management interface 118. Memory 132 represents a data storage capacity associated with embedded controller 130, and can include volatile memory such as Random Access Memory (RAM), non-volatile memory such as a Flash memory device, or a combination thereof. Further, memory 132 can be integrated with embedded controller 130, can be external to embedded controller 130, or can include an integrated memory portion and an external memory portion. Memory 132 includes information describing a memory range 134 that information handling system 100 uses for executing the SMM interrupt handler. Memory range 134 corresponds with the memory range within processor 110's memory map that is associated with SMM memory 150.

SMI output 136 operates to provide an SMI request to SMI input 116, to invoke SMM operations by processor 110. For example, embedded controller 110 can issue an SMI request such that processor 110 can execute error handing, processor thermal monitoring, managing motherboard and component power and thermal controls, or other functions, as needed or desired. Management interface 138 provides side-band communication between embedded controller 130 and processor 110. In particular, embedded controller 130 operates to receive the branch trace messages from branch trace store 114 via management interface 138. Embedded controller 130 also includes a number of control registers and functions, illustrated by a mailbox 140, an address enable 142, and a security enable 144, the operation of which will be described further, below.

SMM memory 150 represents a data storage capacity of information handling system 100 that is associated with SMM operation. SMM memory 150 can be a dedicated portion of a main memory of information handling system 100, and can include volatile memory such as RAM, non-volatile memory such as a Flash memory device, or a combination thereof. SMM memory 150 includes a mailbox command task table 152 that includes one or more task records 154. Each task record 154 includes a task identifier 156, and an associated mailbox task 158. SMM memory is located in a memory range that is described by memory range 134. SMM memory 150 also includes code for implementing the interrupt handler.

Embedded controller 130 operates at the command of processor 110 in SMM. In particular, processor 110 issues a memory mapped transaction to the address of embedded controller 130. The transaction can include a command that is provided to mailbox 140, or can include a read instruction to read the contents of the mailbox. When processor 110 issues a command to embedded controller 130, the processor also writes a task record 154 to mailbox command task table 152 that includes a task identifier 156 and the mailbox task 158 associated with the command. When embedded controller 110 receives a command in mailbox 140, the embedded controller executes the function indicated by the mailbox task. The command includes a task identifier 146 and a mailbox task 148 associated with the command. Task identifier 146 is the same as the task identifier 156, and mailbox task 148 is the same as mailbox task 158.

In particular embodiment, embedded controller 130 is susceptible to attack from malicious code installed on information handling system 100. Here, the malicious code and be executed by processor 100 to issue transactions to embedded controller 130 to direct the embedded controller to perform harmful operations on information handling system 100. An example of a harmful operation includes permitting a component of information handling system 100 to over heat, directing that an operating voltage of a component is set to an unsafe level for the component, unlocking a flash memory device to permit malicious firmware code to be written onto the device, or a combination thereof. The skilled artisan will recognize that other harmful or malicious activities can be contemplated to be performed by embedded controller 130. In a particular counter measure, security enable 144 operates to enable one or more of the security embodiments described below.

In a particular embodiment for preventing malicious code from gaining access to the functions and features of embedded controller 130, when security enable 144 is set and when processor 110 issues a transaction to embedded controller 130, the embedded controller directs management interface 138 to read branch trace store 114, and management interface 118 provides the branch trace store information back to the embedded controller. When embedded controller 130 receives the branch trace store information, the embedded controller compares the branch trace store information with SMM memory range 134. If the branch trace store information indicates that the processor is operating in a memory range that is within SMM memory range 134, then it is demonstrated that processor 110 is operating code from SMM memory 150, and that therefore the code is not malicious code, but is bona fide SMM code. In this case, embedded controller 130 executes the issued transaction. On the other hand, if the branch trace store information indicates that the processor is operating in a memory range that is not within SMM memory range 134, then it is demonstrated that processor 110 is not operating code from SMM memory 150, and that therefore the code is malicious code. Here, embedded controller 130 drops the issued transaction without further processing. In a first case, SMM memory range 134 is statically pre-programmed into memory 132, because, on the particular instantiation of information handling system 100, the memory range of SMM memory 150 is fixed by the design of the information handling system. In another case, when information handling system 100 is booted, the BIOS loads SMM memory range 134 with the memory range that is determined for SMM memory 150. In a particular embodiment, where SMM memory 150 is not yet allocated and initialized by the BIOS, the feature of checking to see if the executed code is within SMM memory 150, is turned off, as indicated by a first state of security enable 144, so that the BIOS can initialize various components of information handling system 100 based upon commands that are executed based upon code that is not in SMM memory 150. At a later point in the boot of information handling system 100, after SMM memory 150 is allocated, the feature of checking to see if the executed code is within SMM memory 150, is turned on, as indicated by a second state of security enable 144, to secure the operation of embedded controller 130.

Figure 2:
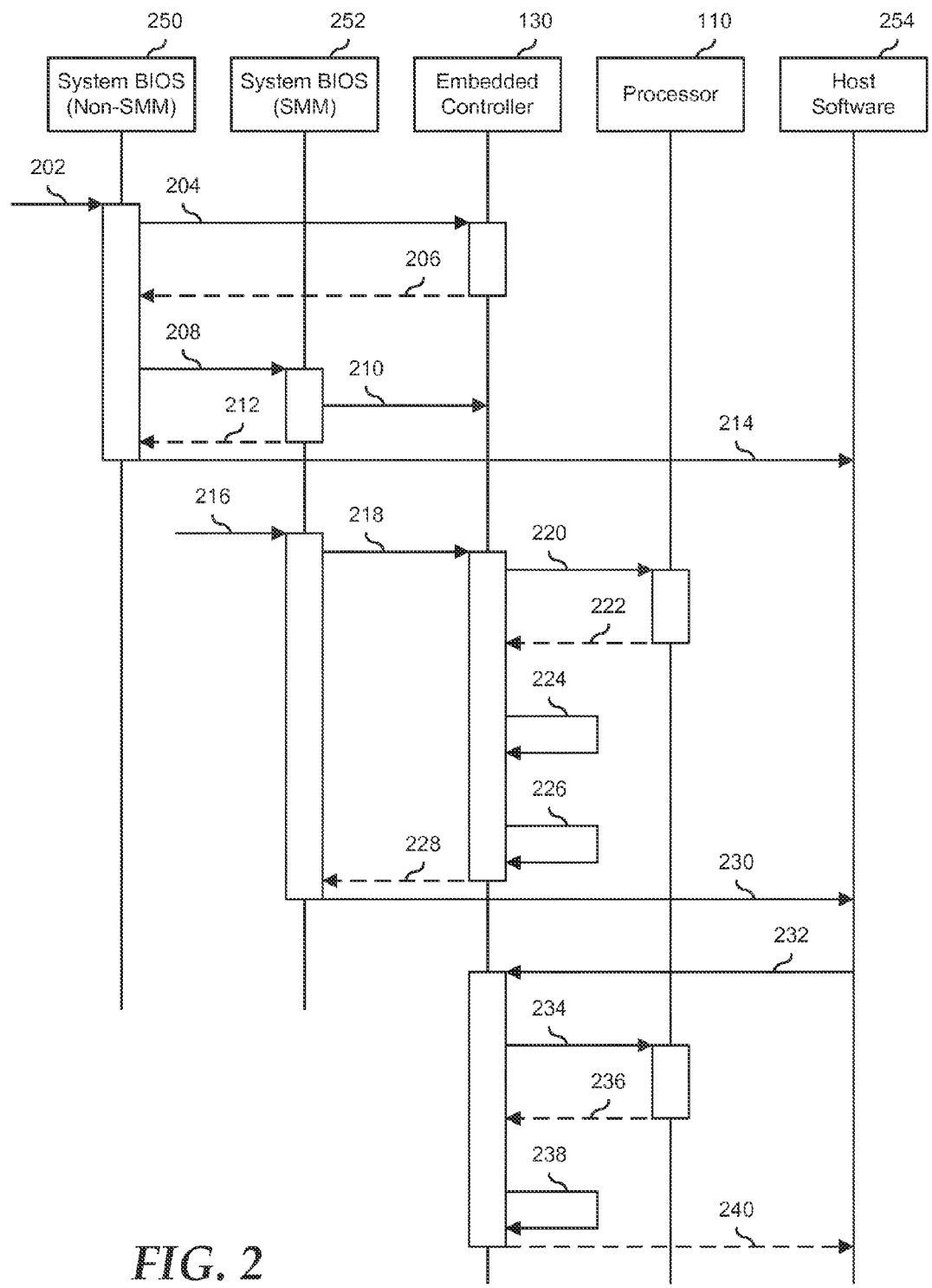
FIG. 2 is a diagram illustrating a method for securing communications between a processor and an embedded controller by verifying that the processor is operating in System Management Mode.

FIG. 2 illustrates a method for securing communications between processor 110 and embedded controller 130 by verifying that the processor is operating in SMM. A system reset or power-on of information handling system 100 is received 202, initiating a non-SMM portion of a system BIOS 250 to boot the information handling system. In the boot process, one or more management transactions 204 are executed and embedded controller 130 executes the function called for in the transaction and provides a response 206, which may include an acknowledgement that the transaction has been executed, a return of data to non-SMM BIOS 250, or a combination thereof. Non-SMM BIOS 250 initializes 208 an SMM portion of the system BIOS 252, including setting up a range of addresses for SMM memory 150. SMM BIOS 252 enables the security mode 210 of embedded controller 130 by setting security enable 144, and returns 212 execution to non-SMM BIOS 250. In a particular embodiment, SMM BIOS 252 also sends SMM memory range 134 when the security mode is enabled 210. After security enable 144 is set to the second state, system BIOS 250 completes the boot of information handling system 100 and turns initiates 214 runtime processing by host software 254.

After initiation of runtime 214, SMM BIOS 252 is invoked 216 that includes a management transaction 218. In response, embedded controller 130 sends a read request 220 to processor 110, for example, via management interface 138, to receive branch trace store 114. In particular, embedded controller 130 requests information related to the most recent branch trace message. Processor 110 provides the branch trace information 222 to embedded controller, for example via management interface 118. Embedded controller 130 verifies 224 that processor 110 is executing code out of SMM memory 150, and, having determined that the processor is executing SMM code, performs the task 226 that is indicated by the management transaction. Then embedded controller 130 provides a response 228, which may include an acknowledgement that the transaction has been executed, a return of data to SMM BIOS 252, or a combination thereof.

At a different time after initiation of runtime 214, host software 254 initiates a management transaction 232. In response, embedded controller 130 sends a read request 234 to processor 110, for example, via management interface 138, to receive branch trace store 114. Processor 110 provides the branch trace information 236 to embedded controller, for example via management interface 118. Embedded controller 130 determines 238 that processor 110 is not executing code out of SMM memory 150, and, aborts the task 240 that is indicated by the management transaction.

Returning to FIG. 1, in another particular embodiment for preventing malicious code from gaining access to the functions and features of embedded controller 130, when security enable 144 is set, embedded controller 130 issues an SMI on SMI output 136 in response to a command to enable address decoding. Here, when information handling system 100 is initialized, address enable 142 is cleared such that embedded controller 130 ignores bus commands that are issued to the embedded controller. Then, when processor 110 needs to issue management transactions to embedded controller 130, the processor will first set address enable 142 such that the embedded controller will respond to bus commands that are issued to embedded controller, and set an address enable flag 160 in SMM memory, indicating that the processor set the address enable.

However, at this point, embedded controller 130 is unable to detect whether or not address enable 142 was set as a result of a legitimate SMM operation, or as a result of malicious code operating on information handling system. In order to ensure that the re-enabling of addressing of embedded controller 130 was performed at the behest of the SMM code, the embedded controller issues an SMI on SMI Output 136, and processor 110 continues in SMM to service the interrupt from the embedded controller. The SMI is accompanied with a request from embedded controller 130 to verify that the embedded controller had address enable 142 set in response to SMM code. When processor 110 receives the request, the processor checks address enable flag 160 to determine whether or not the command to set address enable 142 was valid. If the command was valid, processor 110 issues a management transaction to embedded controller 130 indicating that it was in response to SMM code that address enable 142 was set and the embedded controller proceeds to decode management transactions addressed to the embedded controller. After the management transactions are complete, processor 110 issues a management transaction to clear address enable 142, thereby redirecting embedded controller 130 to ignore bus commands that are issued to the embedded controller. If the command to set address enable 142 was not valid (i.e., if address enable flag 160 is cleared), processor 110 issues a management transaction to embedded controller 130 indicating that the command to set the address enable was not valid, and the embedded controller maintains the address enable as cleared and thus ignores future bus commands that are issued to the embedded controller.

In a particular embodiment, embedded controller 130 operates to detect when I/O cycles are present by monitoring a LFRAME# signal of an LPC bus. When LFRAME# is asserted, embedded controller 130 notes that an L/O cycle from processor 110 has been initiated. Then, when LFRAME# is deasserted, embedded controller 130 checks to see if address enable 142 has been set, and asserts SMI output 132 when the address enable is set. In a particular embodiment, processor 110 disables all other SMI inputs, such as by masking SMI outputs from the other components of information handling system 100, before setting address enable 142 in embedded controller 110.

Figure 3:
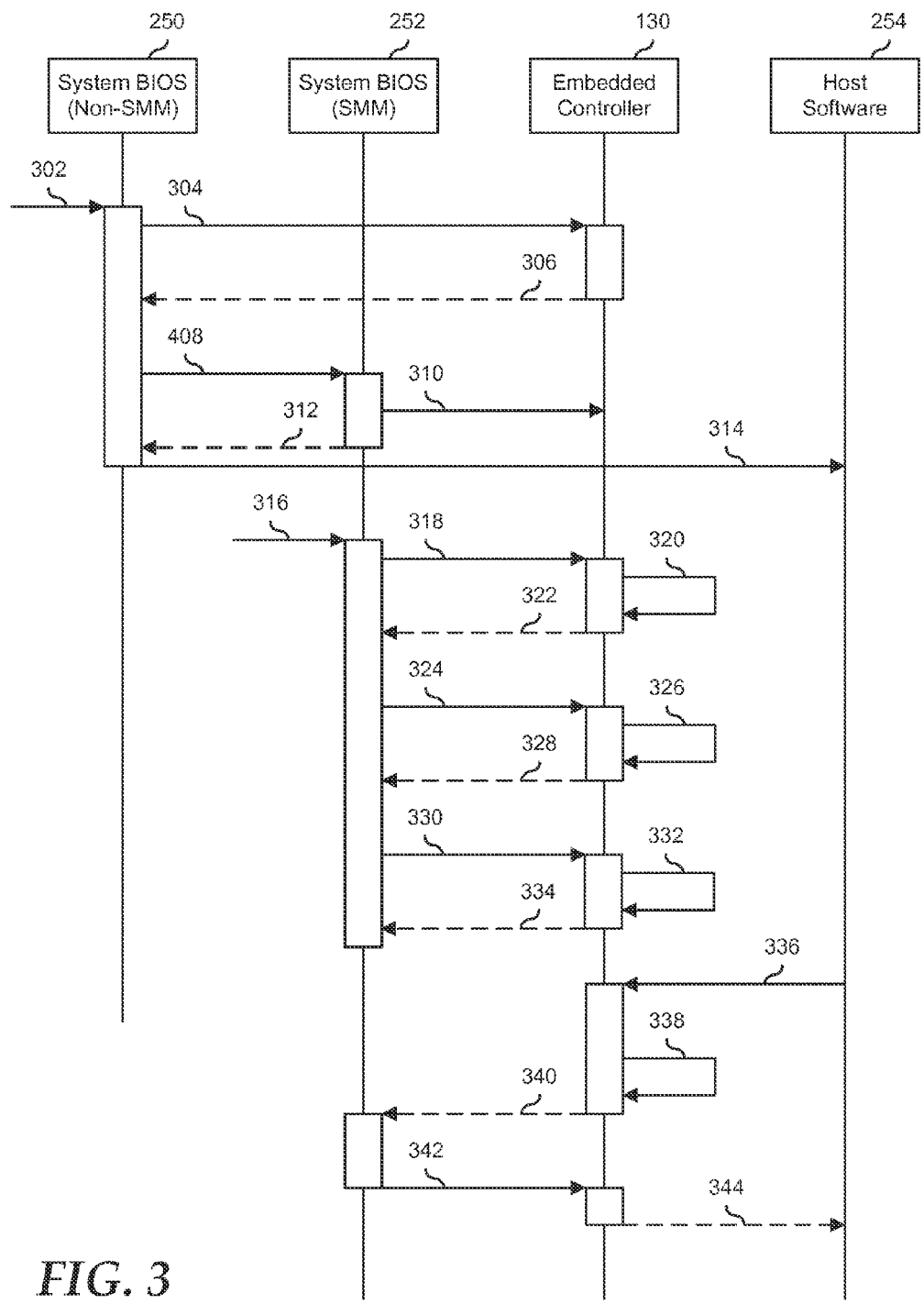
FIG. 3 is a diagram illustrating a method for securing communications between a processor and an embedded controller by verifying that the processor initiated address decoding in the embedded controller.

FIG. 3 illustrates a method for securing communications between processor 110 and embedded controller 130 by verifying that the processor initiated address decode enable. A system reset or power-on of information handling system 100 is received 302, initiating a non-SMM portion of a system BIOS 250 to boot the information handling system. In the boot process, one or more management transactions 304 are executed and embedded controller 130 executes the function called for in the transaction and provides a response 306, which may include an acknowledgement that the transaction has been executed, a return of data to non-SMM BIOS 250, or a combination thereof. Non-SMM BIOS 250 initializes 308 an SMM portion of the system BIOS 252, including setting up a range of addresses for SMM memory 150. SMM BIOS 252 enables the security mode 310 of embedded controller 130 by setting security enable 144, and returns 312 execution to non-SMM BIOS 250. After security enable 144 is set to the second state, system BIOS 250 completes the boot of information handling system 100 and turns initiates 314 runtime processing by host software 254.

After initiation of runtime 314, SMM BIOS 252 is invoked 316 and the SMM BIOS issues a command 318 to embedded controller 130 to enable address decoding. Embedded controller 130 detects 320 the command to enable address decoding, and asserts an SMI 322 on SMI output 136. When SMM BIOS 252 receives SMI 322, the SMM BIOS checks address enable flag 160, determines that the SMM BIOS sent the command, issues a confirmation that the SMM BIOS initiated the management transaction to enable address decoding, and also issues the management command 324 to embedded controller 130. Embedded controller 130 performs the task 332 that is indicated by the management transaction, and provides a response 334, which may include an acknowledgement that the transaction has been executed, a return of data to SMM BIOS 252, or a combination thereof.

At a different time after initiation of runtime 314, host software 254 issues a command 336 to embedded controller 130 to enable address decoding. Embedded controller 130 detects 338 the command to enable address decoding, and asserts an SMI 340 on SMI output 136. When SMM BIOS 252 receives SMI 340, the SMM BIOS checks address enable flag 160, determines that the SMM BIOS did not send the command, and issues an indication 342 that the SMM BIOS did not initiate the management transaction to enable address decoding, and embedded controller 130 ignores the request to enable address decoding.

Returning again to FIG. 1, in another particular embodiment for preventing malicious code from gaining access to the functions and features of embedded controller 130, when security enable 144 is set, embedded controller 130 issues an SMI on SMI output 136 in response to receiving a management transaction. As noted above, when embedded controller 130 receives a management transaction in mailbox 140, the command includes task identifier 146 and mailbox task 148 associated with the command. When processor 110 responds to the SMI, embedded controller 130 provides task identifier 146 and mailbox task 148 to the processor, and the processor compares the received task identifier and mailbox task with task identifier 156 and mailbox task 158 to determine if the embedded controller is responding to a legitimate management transaction. If task identifier 146 and mailbox task 148 do not correspond with task identifier 156 and mailbox task 158, then processor 110 provides an indication to embedded controller 130 to drop the management transaction. In a particular embodiment, processor 110 disables all other SMI inputs, such as by masking SMI outputs from the other components of information handling system 100, before sending the management transaction to embedded controller 110.

Figure 4:
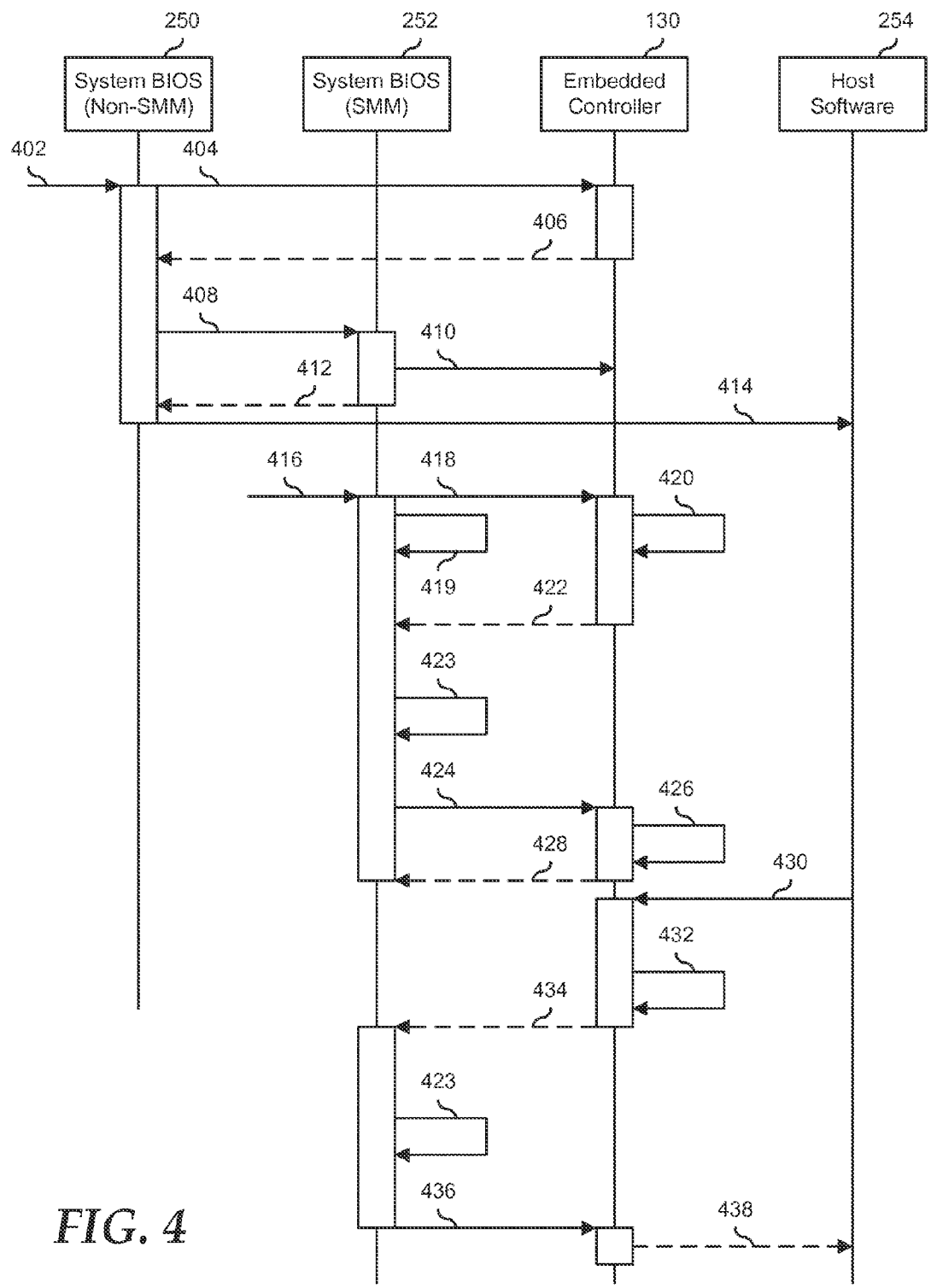
FIG. 4 is a diagram illustrating a method for securing communications between a processor and an embedded controller by verifying that the processor initiated a management transaction.

FIG. 4 illustrates a method for securing communications between processor 110 and embedded controller 130 by verifying that the processor initiated a management transaction. A system reset or power-on of information handling system 100 is received 402, initiating a non-SMM portion of a system BIOS 250 to boot the information handling system. In the boot process, one or more management transactions 404 are executed and embedded controller 130 executes the function called for in the transaction and provides a response 406, which may include an acknowledgement that the transaction has been executed, a return of data to non-SMM BIOS 250, or a combination thereof. Non-SMM BIOS 250 initializes 408 an SMM portion of the system BIOS 252, including setting up a range of addresses for SMM memory 150. SMM BIOS 252 enables the security mode 410 of embedded controller 130 by setting security enable 144, and returns 412 execution to non-SMM BIOS 250. After security enable 144 is set to the second state, system BIOS 250 completes the boot of information handling system 100 and turns initiates 414 runtime processing by host software 254.

After initiation of runtime 414, SMM BIOS 252 is invoked 416 and the SMM BIOS issues a management transaction 418 to embedded controller 130 to enable address decoding. SMM BIOS 252 also writes task identifier 156 and mailbox task 158 to mailbox command task table 152. Embedded controller 130 detects 420 the management task, and asserts an SMI 422 on SMI output 136 and provides task identifier 146 and mailbox task 148 to the SMM BIOS. When SMM BIOS 252 receives SMI 422, the SMM BIOS compares 423 task identifier 146 and mailbox task 148 with task identifier 156 and mailbox task 158 to verify that the SMM BIOS issued the management transaction. SMM BIOS 252 then issues a confirmation 424 that the SMM BIOS initiated the management transaction to embedded controller 130. Embedded controller 130 performs the task 426 that is indicated by the management transaction, and provides a response 428, which may include an acknowledgement that the transaction has been executed, a return of data to SMM BIOS 252, or a combination thereof.

At a different time after initiation of runtime 414, host software 254 issues a management transaction 430 to embedded controller 130. Embedded controller 130 detects 432 the management task, and asserts an SMI 434 on SMI output 136 and provides task identifier 146 and mailbox task 148 to the SMM BIOS. When SMM BIOS 252 receives SMI 434, the SMM BIOS compares 435 task identifier 146 and mailbox task 148 with task identifier 156 and mailbox task 158 to verify that the SMM BIOS did not issue the management transaction, and then sends an indication 436 that that the SMM BIOS did not initiate the management transaction to embedded controller 130, and the embedded controller ignores the management transaction.

Figure 5:
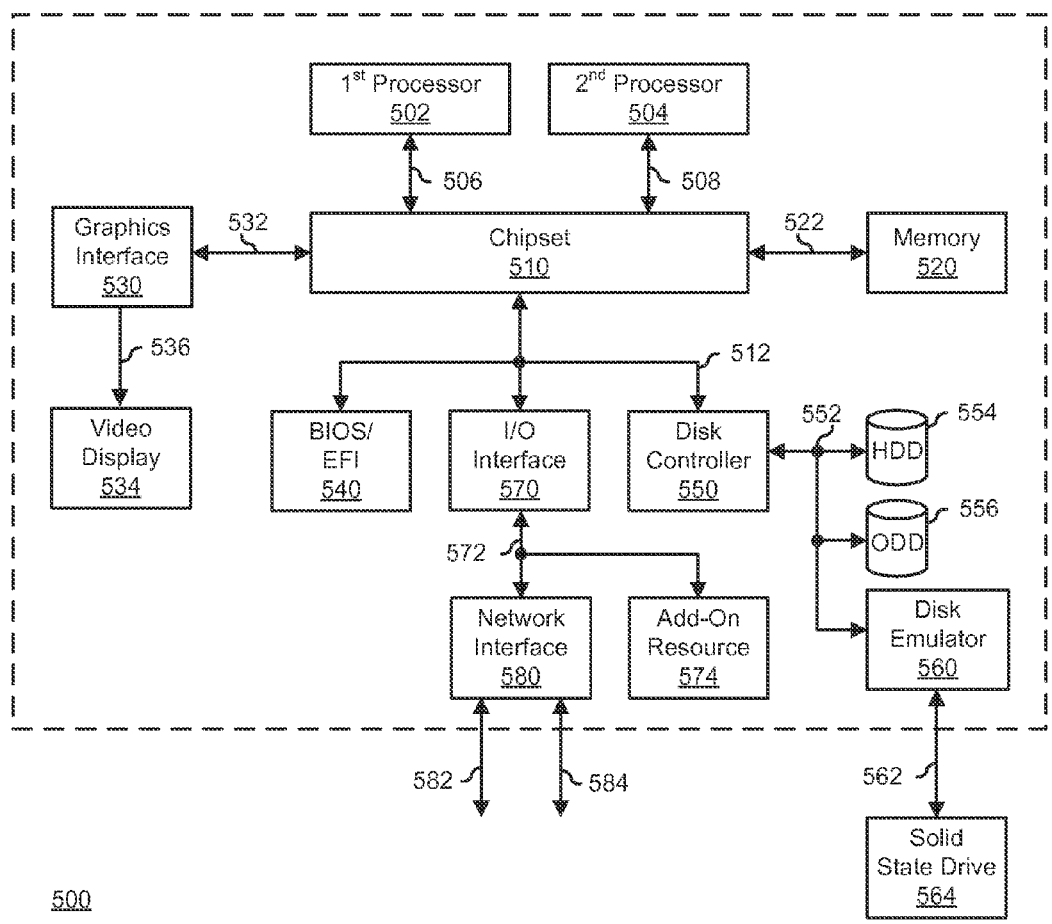
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor including a primary interface and a system management interrupt interface, wherein the processor receives a system management interrupt via the system management interface; and
an embedded controller coupled to the processor via the primary interface and via the system management interrupt interface, wherein the embedded controller:
receives, via the primary interface, a command from the processor to enable address decoding;
sends, via the system management interrupt interface, the system management interrupt to the processor in response to receiving the command; and
receives, via the primary interface, an indication from the processor in response to sending the system management interrupt, wherein the indication indicates whether or not the processor was operating in a system management mode when the processor sent the command.

2. The information handling system of claim 1, wherein the embedded controller further receives a management transaction in response to the indication that the processor was operating in a system management mode.

3. The information handling system of claim 1, wherein the embedded controller further disables address decoding in response to the indication that the processor was not operating in a system management mode.

4. The information handling system of claim 1, further comprising:
a memory including an address enable flag, wherein the processor determines whether or not the processor was operating in the system management mode based upon the address enable flag.

5. The information handling system of claim 1, wherein the embedded controller includes a security mode.

6. The information handling system of claim 5, wherein the embedded controller sends the system management interrupt when the embedded controller is operating in the security mode.

7. The information handling system of claim 5, wherein, prior to sending the command, the processor:
disables address encoding in the embedded controller; and
sets the embedded controller to operate in the security mode.

8. The information handling system of claim 1, wherein the system management interrupt includes information indicating that the embedded controller received the command to enable address decoding.

9. An information handling system, comprising:
a processor including a primary interface and a system management interrupt interface, wherein the processor receives a system management interrupt via the system management interface; and
an embedded controller coupled to the processor via the primary interface and via the system management interrupt interface, wherein the embedded controller:
receives, via the primary interface, a management transaction from the processor; and
in response to receiving the management transaction:
sends, via the system management interrupt interface, a system management interrupt to the processor; and
receives, via the primary interface, an indication from the processor in response to the system management interrupt, wherein the indication indicates whether or not the processor was operating in a system management mode when the processor sent the management transaction.

10. The information handling system of claim 9, wherein the embedded controller further executes the management transaction in response to the indication that the processor was operating in a system management mode.

11. The information handling system of claim 9, wherein the embedded controller further drops the management transaction in response to the indication that the processor was not operating in a system management mode.

12. The information handling system of claim 9, further comprising:
a memory including a management task record, wherein the processor determines whether or not the processor was operating in the system management mode based upon the management task record.

13. The information handling system of claim 9, wherein the embedded controller includes a security mode.

14. The information handling system of claim 13, wherein the embedded controller sends the system management interrupt when the embedded controller is operating in the security mode.

15. The information handling system of claim 13, wherein, prior to sending the command, the processor:
disables address encoding in the embedded controller; and
sets the embedded controller to operate in the security mode.

16. The information handling system of claim 9, wherein the system management interrupt includes information indicating that the embedded controller received management transaction.

17. A non-transitory computer-readable medium including code for performing a method, the method comprising:
receiving, at an embedded controller of an information handling system, from a processor of the information handling system, a command to configure address decoding, wherein the embedded controller is coupled to the processor via a primary interface and via a system management interrupt interface, and the command is received via the primary interface; and
in response to receiving the management transaction:
sending, via the system management interrupt interface, the system management interrupt to the processor in response to receiving the command; and
receiving, via the primary interface, an indication from the processor in response to the system management interrupt, wherein the indication indicates whether or not the processor was operating in a system management mode when the processor sent the command.

18. The non-transitory computer-readable medium of claim 17, further comprising:

receiving, by the embedded controller, a management transaction in response to the indication that the processor was operating in a system management mode.

19. The non-transitory computer-readable medium of claim 17, further comprising:

disabling address decoding by the embedded controller in response to the indication that the processor was not operating in a system management mode.

20. The non-transitory computer readable medium of claim 17, wherein:

the embedded controller includes a security mode; and
the method further comprises sending the system management interrupt when the embedded controller is operating in the security mode.

* * * * *